April 25, 1944. H. C. DONER 2,347,176
FRAME FOR MOUNTING AND SUPPORTING MIRRORS
Filed July 11, 1940 2 Sheets-Sheet 1

Inventor
HALBERT CRESTON DONER.
By Frank Fraser
Attorney

April 25, 1944. H. C. DONER 2,347,176
FRAME FOR MOUNTING AND SUPPORTING MIRRORS
Filed July 11, 1940 2 Sheets-Sheet 2
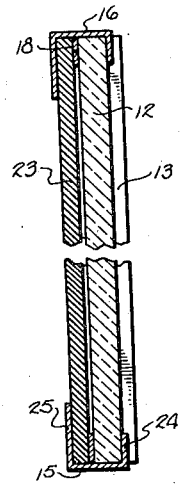
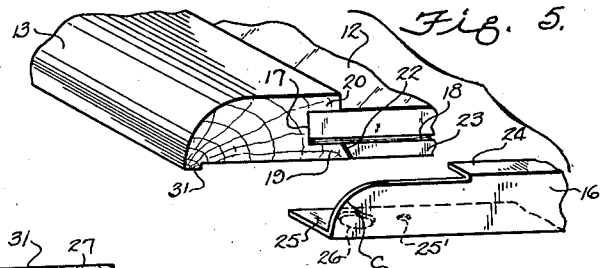
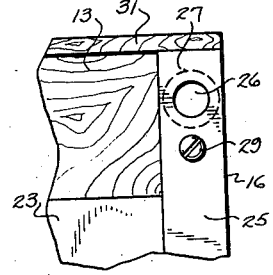
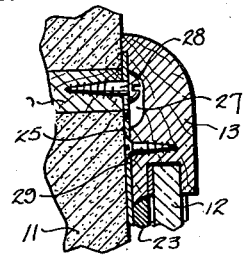
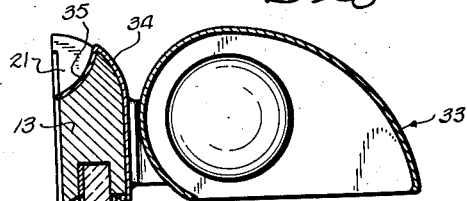
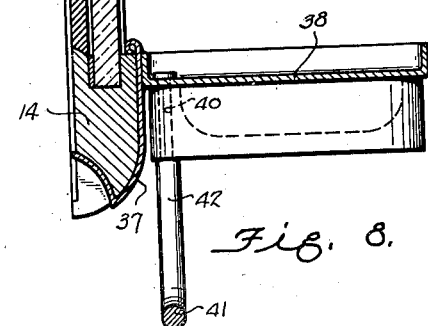
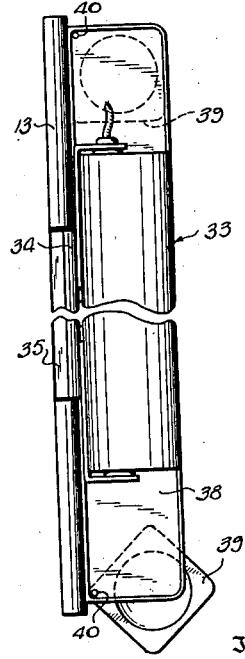
Inventor
HALBERT CRESTON DONER.
By Frank Fraser
Attorney Patented Apr. 25, 1944

2,347,176

UNITED STATES PATENT OFFICE 2,347,176

FRAME FOR MOUNTING AND SUPPORTING MIRRORS

Halbert Creston Doner, Toledo, Ohio, assignor to Libbey-Owens-Ford Glass Company, Toledo, Ohio, a corporation of Ohio Application July 11, 1940, Serial No. 344,951

5 Claims. (Cl. 40—152)

The present invention relates broadly to mirrors and more particularly to improved frame means for mounting and supporting mirrors.

An important object of the invention is to provide a simple and easily assembled frame or supporting means for mirrors which is so designed that the mirror may be used for a number of different purposes at will. Consequently, it may be referred to as a utility mirror, being capable of such uses as a hung mirror upon walls, doors, or the like; or used as a portable serving tray, or as a removable top for coffee tables and similar pieces of furniture.

Roughly speaking, the making of a mirror for use by the ultimate consumer may be divided into two phases: first, the making of the reflecting plate itself such as by applying a film of suitable metallic silver upon glass followed by a protective coating of permanent backing; and second, mounting of the mirror in a suitable frame or upon a structural backing to permit placement thereof upon the wall or other place of use. Quite often the cost of the reflecting plate (mirror) itself represents but a small part of the cost to the consumer in view of the relative high cost of the frame and cost of installation of said mirror and its mounting.

The present invention relates to the second phase of the problem, and an important object is to provide a frame or mounting for a mirror which may be produced in the nature of a prefabricated or knocked-down kit which can be turned out by mass production methods and assembled with a mirror or other reflecting plate without the need of special tools or skilled labor and yet the finished product will have a pleasing and professional appearance.

A further object of the invention is to provide such a mounting or support for a mirror wherein the component parts of the frame are shaped, cut, drilled and tapped so that a manufacturer, jobber, retailer, or consumer can assemble the frame in a minimum of time and have a finished product which can either be mounted upon the wall to be employed as an ordinary mirror; removed from the wall and utilized as a serving tray; or placed upon a support in a manner to produce a table. In addition, the invention contemplates the provision of accessory equipment which can be readily snapped into position on the frame or quickly removed at the will of the user.

Other objects and advantages of the invention will become more apparent during the course of the following description when taken in connection with the accompanying drawings.

In the drawings wherein like numerals are employed to designate like parts throughout the same:

Fig. 4 is a transverse vertical section through the mirror and its mounting;

Fig. 5 is a fragmentary perspective view illustrating some of the parts before complete assembly;

Fig. 6 is an enlarged fragmentary bottom plan view of one corner of the assembled mirror and mounting;

Fig. 7 is a fragmentary sectional view showing mounting of the mirror upon a wall or like surface;

Fig. 8 is a transverse vertical section of the mirror illustrating auxiliary equipment applied to the mirror; and Fig. 9 is a top plan view of the construction shown in Fig. 8.

Obviously, the present invention is not restricted to any particular size of mirror and mounting, but for purposes of illustration and by way of example, detailed specifications will be given for a construction in which a sixteen inch by twenty-four inch one-quarter inch plate glass mirror is involved.

Figure 1:
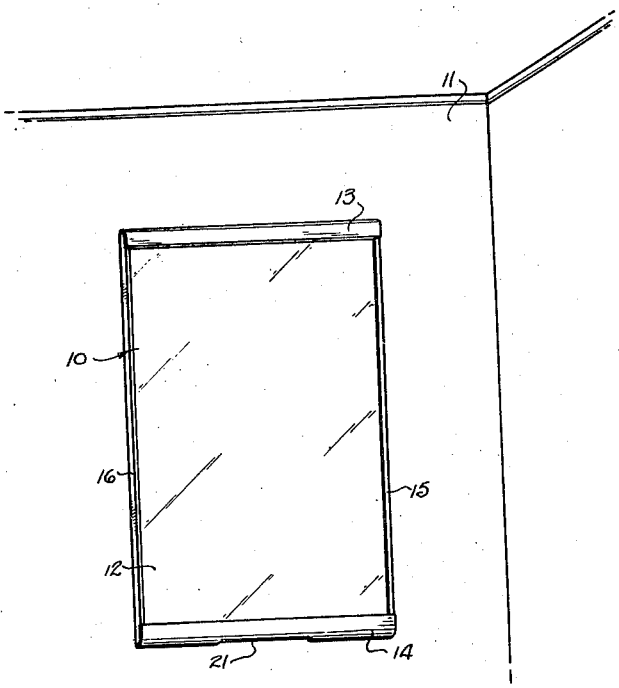
Fig. 1 is a perspective view illustrating a finished mirror hung upon a wall.
Figure 2:
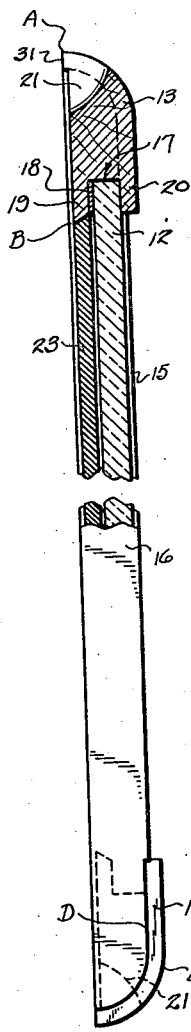
Fig. 2 is an enlarged side elevation of the same, partly in section.

The numeral 10 represents the mirror and mounting in its entirety and, as shown in Fig. 1, it is mounted upon the wall 11. As shown in Fig. 2, the light reflecting sheet or plate 12 may be an ordinary glass mirror, and the present invention is in no way concerned with the particular ways and means utilized in the preparation of the light reflecting plate per se. As is well understood, the mirror 12 may comprise the sheet of glass, preferably one-quarter inch plate glass, having a metallic reflecting film on its rear surface which in turn is protected from the atmosphere by suitable protective coatings such as copper powder, paint, varnish, or metallic coatings, deposited upon the reflecting film by electro deposition.

The mirror 12 is mounted in a frame comprising broadly the handle or end portions 13 and 14 and the side members 15 and 16. The end portions 13 and 14 are identical to one another and the sides 15 and 16 are likewise identical to one another. The ends or handle members are preferably formed from a wood molding and hard wood can be used to advantage. As shown particularly in Figs. 2 and 5, the end members have a groove 17 extending along one edge horizontally throughout its entire length. The groove may have a depth of about one-quarter inch and a width slightly in excess of the thickness of the mirror to permit insertion of a gasket 18 between the mirror and the bottom flange 19 of the molding. The flange 19 and the upper flange 20 of the molding may be approximately one-eight inch in thickness each, with the over-all width of the molding from the point A to the point B in Fig. 2 being approximately one and one-quarter inches.

The outer edge of the molding may be curved as shown or otherwise treated to give the desired profile for decorative effects and is provided throughout a portion of its length at least with the cut-out segments 21 to create a finger notch.

It will be noted in Figs. 2 and 5 that the lower or bottom flange 19 terminates in the angular face 22 which may be beveled on a sixty degree angle. Both of the handle members 13 and 14 are similarly beveled, thus permitting a backing member 23 having ends cut on the opposite bias to be keyed or locked into position when the ends of the frame are in assembled position upon the mirror. The backing 23 is preferably of some composition material, for example Masonite, which will give adequate protection to the mirror without adversely affecting the total weight of the unit and without becoming unduly buckled or warped when in use. It will be noted that no nails, screws, or cement are required to hold the backing in place.

The side frame members are metal, being substantially U-shaped in cross section, as shown particularly in Figs. 4 and 5. The metal side pieces can be cold roll metal approximately of .040 inch gauge steel and having an upper or top flange 24 overlying the glass surface about one-quarter of an inch and a lower or bottom flange 25 which overlies the backing 23 about one-half inch. The metal can be painter or otherwise decorated to match or harmonize with the finish of the wooden handle end members.

As a matter of economy, the metal channel member may be formed into long lengths which can then be cut into suitable sections, the length of each section being dependent of course upon the size of mirror being mounted. As a practical matter, this type of mirror can be made in a number of stock sizes with appropriate frame kits for each size in a selection of finishes. Each side member has a part of the top flange 24 cut away as shown in Fig. 5, and the end thereof curved as shown by the letter C. When assembled, the profile of the metal end, represented by the letter D in Fig. 2, will be parallel to but spaced from the profile E of the wooden handle member and, due to the thickness of the metal, an attractive design is produced. Of course, if the handle end assumes a different configuration than that illustrated, the portion C of the side members will be changed accordingly.

To permit assembly and mounting of the unit, the side plates or frame members 15 and 16 are provided with two holes near each end thereof. The smaller and innermost hole 25 is drilled for a screw, and with the size of mirror being specifically described, a three-eighths inch No. 4 flat head wood screw is adequate. The larger or outermost hole 26 may be about nine-thirty-seconds of an inch in diameter for reception of a mounting screw or hook.

Also, before assembly, the wooden handle members are provided with two holes near each end. One hole is drilled so that it will be in alignment with the hole 25 when the end and side members of the frame are in assembled relationship for reception of the wood screw. This is particularly advisable when the handle members 13 and 14 are of hard wood. The second and larger hole or cavity in each end of the handle portion is in the nature of a recess 27, clearly shown in full lines in Fig. 7 and represented by dotted lines in Fig. 6. This cavity may be referred to as a seven-sixteenths inch hole and is large enough and has a depth suitable to receive the head of a mounting screw 28 when the mirror and its mounting are placed upon a vertical support. As shown, the head of the screw 28 passes through the opening 26 in the side channel.

Thus, it will be seen that the two handle ends of the frame and the two metal side members are prefabricated so that when framing a mirror, it is only necessary to insert the light reflecting plate 12 and backing 23 between the four members and to insert a single screw 29 at each end of the frame, each screw 29 of course going through a hole 25 in the metal and being received in the corresponding drilled opening of the handle member. As as result, when the four screws 29 are in place, the assembly of the mirror frame is completed, and quite obviously this can be done by the use of a screw driver only and requires no cutting and fitting or use of special skill or tools. However, by reason of the shape and construction of the component parts, the assembled mirror and its frame will be rugged and capable of use for a diversity of purposes. Such various uses of the mirror is facilitated in part by the finger notches 21 formed in both ends of the frame and when it is desired to mount the unit upon a vertical support, for example a wall or door, it is only necessary to use two screws 28.

As shown in Fig. 7, a wooden plug 30 is first inserted into the wall 11, which then receives the screw 28. Naturally, two screws 28 or their equivalent should be used to hang the mirror, the screws being spaced apart a distance equal to that between the openings 26. Where larger mirrors are to be mounted, it may be well to use four wall screws. When installing the supporting screws 28 or their equivalent, sufficient of the head is left protruding from the wall to permit reception of the flange of the metal frame between the screw head and supporting surface. This is very clearly illustrated in Fig. 7.

In Fig. 1 is shown a mirror, such as has just been described, mounted upon a wall, and it will be noted that no hanging wires or hooks are visible and, furthermore, the frame fits flush against the wall (see Fig. 7) due to the fact that the wooden moldings have the flange 31 corresponding to the thickness of the metal flange 25. As a result of the snug fit, the mirror 10, when mounted as shown in Fig. 1, will give the appearance of a permanent glass panel rather than a temporarily hung mirror. Obviously, the mirror could be hung on its longitudinal axis rather than its vertical axis.

Figure 3:
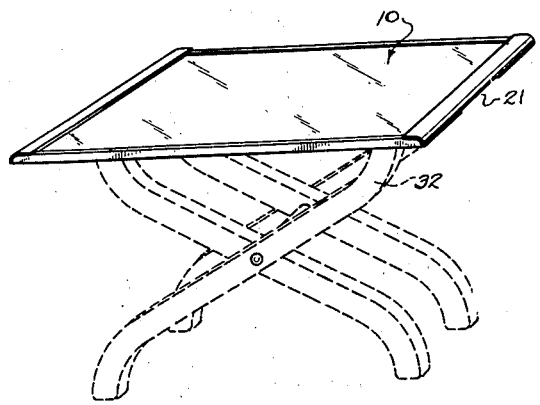
Fig. 3 is a perspective view illustrating employment of the mirror in combination with a stand to produce a coffee table.

It may be that normally the mirror will be suspended upon a wall or door for mirror use, but when occasion requires it may be quickly removed and employed as a serving tray. On the other hand, instead of a portable serving tray, the mirror may be placed on a support to be used as a table. In Fig. 3 is illustrated, in broken lines, a folding support 32 upon which the mirror may be placed when it is to serve as a table. The support 32 of course does not need to be of the folding type but can be of some other construction, and in fact the mirror 10 may be placed on top of a cheap table or any other table just as well, but there is an advantage in being able to use the mirror with a collapsible stand where economy of space is a factor; the collapsible stand can be stored away when the mirror is used upon the wall.

As a further advantage, I have shown in Figs. 8 and 9 attachment of accessories to the mirror. A lamp, designated in its entirety by the numeral 33, carried by a spring arm 34 may be snapped into place. As shown, the arm 34 may have the curved resilient end 35 adapted to be received in the finger notch 21 with the opposite edge of the arm being beaded as at 36 to grip the flange 20 of the molding.

Also, if desired, a similar spring clip device 37 may be associated with the lower handle of the frame, the supporting bracket 37 carrying a tray or shelf 38. In the particular showing made in the drawings, pivoted trays 39 are mounted under the shelf 38 by means of the vertical pins 40. By way of example, powder, hairpins, etc., may be placed in the swinging trays 39 which can be swung into concealed position as shown at the top of Fig. 9 when not in use. A bar or rod 41 may likewise be suspended by means of the hanger 42 from the shelf to give space for towels, neckties, scarfs, and similar articles.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A frame for glass mirror plates and the like portable as a unit, comprising a pair of end members, each of said members having a groove in one edge for receiving the end of the plate and a finger notch in the opposite edge, and a pair of side members, each of said side members having a flange overlying the edge portion of the plate and a flange extending behind the same, said side members being secured to the end members at their respective ends to produce a supporting and carrying frame for said plate, the side members being provided with cut-out portions at each end to receive supporting means carried upon a vertical support to effect vertical hanging of said frame and plate whereby the said frame may be either hung in a vertical position or supported in a horizontal position without disassembly of any of its parts.

2. A frame for glass mirror plates and the like portable as a unit, comprising a pair of wooden supporting members grooved to receive opposite edge portions of the plate and shaped to form handles when the plate is in a substantially horizontal position for use as a tray, metal side members substantially U-shaped in cross section connecting said wooden supporting members and holding the same in assembled relationship upon said plate, and said metal side members being provided with openings for receiving supporting means carried upon a vertical support whereby the said frame may be either hung in a vertical position or supported in a horizontal position without disassembly of any of its parts.

3. A frame for glass mirror plates and the like portable as a unit, comprising a pair of wooden supporting members grooved to receive opposite edge portions of the plate and shaped to form handles when the plate is in a substantially horizontal position for use as a tray, metal side members substantially U-shaped in cross section connecting said wooden supporting members and holding the same in assembled relationship upon said plate, said metal side members being provided with openings for receiving supporting means carried upon a vertical support, and said wooden supporting members being provided with finger notches along their outermost edges whereby the said frame may be either hung in a vertical position or supported in a horizontal position without disassembly of any of its parts.

4. A frame for glass mirror plates and the like portable as a unit, comprising a pair of non-metallic supporting members grooved to receive opposite edge portions of said plate and shaped to form handles when the plate is in a substantially horizontal position for use as a tray, metallic side members substantially U-shaped in cross section associated with said plate and handle portions, the ends of the side members overlapping the ends of the handle members, and screw means passing through said side members and into said handle members at each place where they overlap, the screw means being relied upon wholly to maintain the handle members and side members in assembled relationship with respect to said plate whereby the said frame may be either hung in a vertical position or supported in a horizontal position without disassembly of any of its parts.

5. A frame for glass mirror plates and the like portable as a unit and adapted for vertical hanging or for use as a tray or table top of the character described, comprising a rectangular plate, wooden end members provided with grooves for receiving the ends of the plate, said end members having finger notches to facilitate handling, metallic side members, and screw means for fastening the side members to the end members, said side members having cut-out portions to receive a horizontally disposed supporting member when the frame is hung in a vertical position whereby the said frame may be either hung in a vertical position or supported in a horizontal position without disassembly of any of its parts.

HALBERT CRESTON DONER.